United States Patent
Nakhamkin

(10) Patent No.: US 7,389,644 B1
(45) Date of Patent: Jun. 24, 2008

(54) POWER AUGMENTATION OF COMBUSTION TURBINES BY INJECTION OF COLD AIR UPSTREAM OF COMPRESSOR

(76) Inventor: Michael Nakhamkin, 40 Woodman La., Basking Ridge, NJ (US) 07920

( * ) Notice: Subject to any disclaimer, the term of this patent is extended or adjusted under 35 U.S.C. 154(b) by 0 days.

(21) Appl. No.: 11/655,123

(22) Filed: Jan. 19, 2007

(51) Int. Cl.
*F02C 7/00* (2006.01)

(52) U.S. Cl. .......... 60/772; 60/39.183; 60/727

(58) Field of Classification Search ........... 60/39.181, 60/39.183, 726, 727, 728, 772
See application file for complete search history.

(56) References Cited

U.S. PATENT DOCUMENTS

| | | | |
|---|---|---|---|
| 4,885,912 A | 12/1989 | Nakhamkin | |
| 5,442,904 A * | 8/1995 | Shnaid | 60/39.183 |
| 5,632,143 A | 5/1997 | Fisher et al. | |
| 5,934,063 A | 8/1999 | Nakhamkin | |
| 6,305,158 B1 | 10/2001 | Nakhamkin | |
| 6,745,569 B2 * | 6/2004 | Gerdes | 60/727 |

FOREIGN PATENT DOCUMENTS

| | | |
|---|---|---|
| DE | 102004040890 A1 | 3/2005 |
| RU | 2029119 C1 | 2/1995 |
| SU | 383859 A | 8/1973 |
| WO | WO 92/22741 A1 | 12/1992 |

* cited by examiner

*Primary Examiner*—L. J. Casaregola
(74) *Attorney, Agent, or Firm*—Manelli Denison & Selter PLLC; Edward J. Stemberger

(57) ABSTRACT

A combustion turbine power generation system 10 includes a combustion turbine assembly 11 including a main compressor 12 constructed and arranged to receive ambient inlet air, a main expansion turbine 14 operatively associated with the main compressor, a combustor 16 constructed and arranged to receive compressed air from the main compressor and to feed the main expansion turbine, and an electric generator 15 associated with the main expansion turbine for generating electric power. Pressure reducing structure 28 is constructed and arranged to reduce pressure of compressed air from a source of compressed air to atmospheric pressure and thus to reduce a temperature of the compressed air from the source of compressed air to a temperature below ambient temperature when exhausted from the pressure reducing structure. Structure 32 is associated with the pressure reducing structure to permit mixing of the air exhausted from the pressure reducing structure and the ambient inlet air to reduce a temperature of inlet air to the main compressor and thus increase the combustion turbine assembly power.

27 Claims, 2 Drawing Sheets

POWER AUGMENTATION OF COMBUSTION TURBINES BY INJECTION OF COLD AIR UPSTREAM OF COMPRESSOR

FIELD OF THE INVENTION

This invention relates to combustion turbine power systems and, more particularly, to augmenting power of the system by reducing air temperature at an inlet of the main compressor of the system.

BACKGROUND OF THE INVENTION

It is well known that combustion turbine power generating systems have significant power degradation associated with increased ambient temperature or high elevations. This loss of power is primarily associated with the reduced inlet airflow mass of the combustion turbine power generating systems, caused by the reduced inlet ambient air density.

There are a number of technologies that pre-condition inlet air to recover power lost by combustion turbines due to high ambient temperatures/high elevation. For example, evaporative coolers, inlet fogging and "wet compression" technologies provide power augmentation by a combination of inlet air humidification and cooling with associated increased mass flow through the combustion turbine. However, this type of inlet air cooling is limited in areas that don't have a sufficient supply of water available. Inlet chillers also treat ambient air by cooling ambient air with chillers and provide a corresponding increased mass flow and power augmentation. However, high capital cost and high operating and maintenance costs are associated with these chillers.

Thus, there is a need to cool combustion turbine inlet air by mixing it with cold air extracted, for example, from an external air expander exhaust providing an effective alternative power augmentation option: power augmentation of a combustion turbine power generation system with additional power provided by an expander.

SUMMARY OF THE INVENTION

An object of the invention is to fulfill the need referred to above. In accordance with the principles of the present invention, this objective is achieved by providing a combustion turbine power generation system that includes a combustion turbine assembly having a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power. Pressure reducing structure is constructed and arranged to reduce pressure of compressed air from a source of compressed air to atmospheric pressure and thus to reduce a temperature of the compressed air from the source of compressed air to a temperature below ambient temperature when exhausted from the pressure reducing structure. Structure is associated with the pressure reducing structure to permit mixing of the air exhausted from the pressure reducing structure and the ambient inlet air to reduce a temperature of inlet air to the main compressor.

In accordance with another aspect of the invention, a method of reducing a temperate of inlet air to a combustion turbine assembly is provided. The combustion turbine assembly includes a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power. The method provides a source of compressed air. The pressure of the compressed air from the source is reduced to atmospheric pressure and thus a temperature of the compressed air from the source is reduced to a temperature below ambient temperature. The compressed air at a temperature below ambient temperature is mixed with the ambient inlet air to reduce a temperature of the inlet air to the main compressor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawing, wherein like reference numerals refer to like parts, in which.

DETAILED DESCRIPTION OF THE EXEMPLARY EMBODIMENTS

Figure 1:
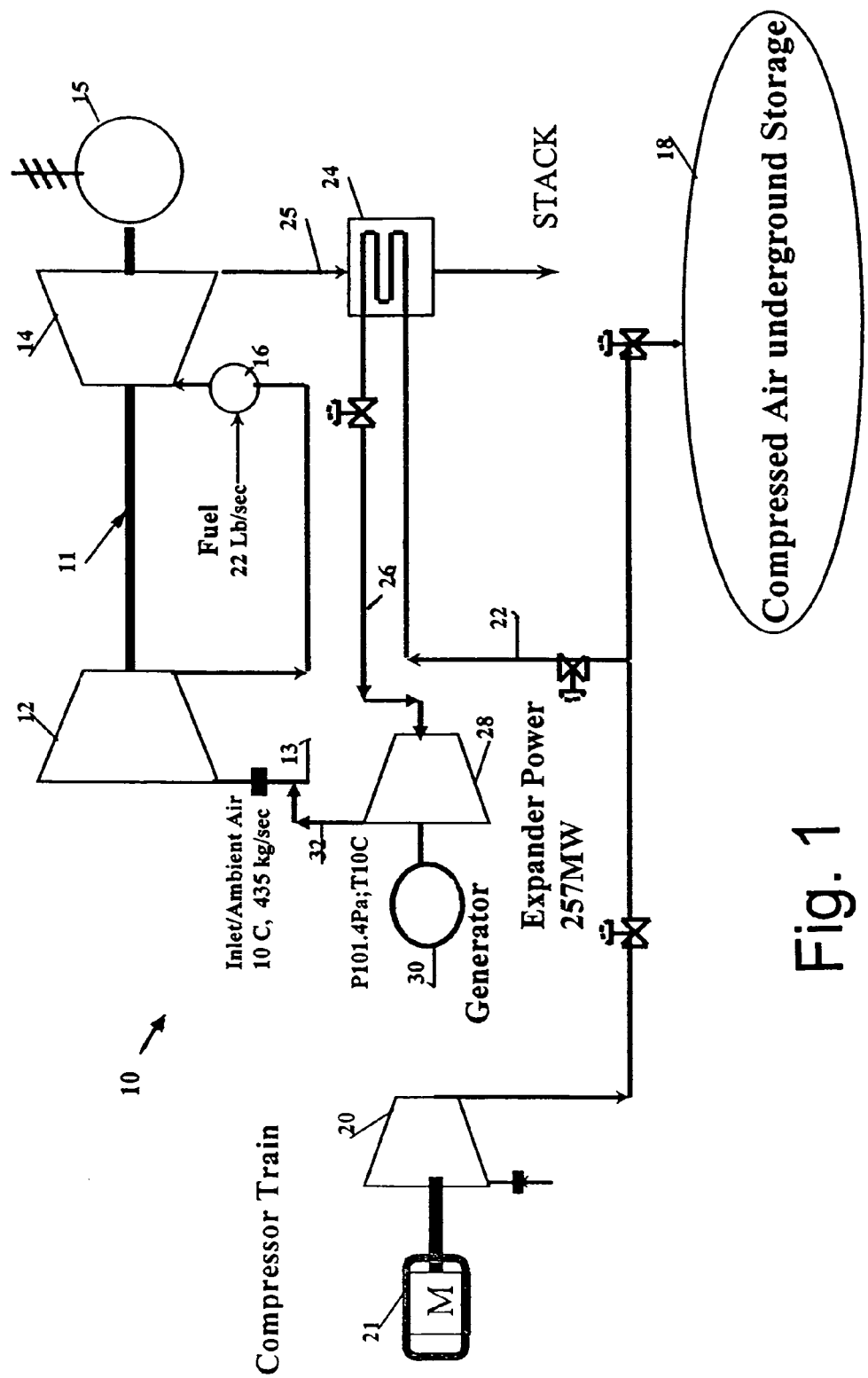
FIG. 1 is a schematic illustration of a combustion turbine power generation system with power augmentation using a compressed air storage supplying compressed air, preheated in a heat exchanger, to an expander; with the expander exhaust flow, having lower than ambient temperature, being mixed with inlet flow to a combustion turbine power generation system provided in accordance with the principles of the present invention.

With reference to FIG. 1, a combustion turbine power generation system with power augmentation, generally indicated as 10, is shown in accordance with an embodiment of the present invention. The system 10 includes a conventional combustion turbine assembly, generally indicated at 11, having a main compressor 12 receiving, at inlet 13, a source of inlet air at ambient temperature and feeding a combustor 16 with the compressed air; a main expansion turbine 14 operatively associated with the main compressor 12, with the combustor 16 feeding the main expansion turbine 14, and an electric generator 15 for generating electric power.

In accordance with an embodiment, compressed air storage 18 is provided. The storage 18 is preferably an underground storage structure that stores air that is compressed by at least one auxiliary compressor 20. In the embodiment, the auxiliary compressor 20 is driven by a motor 21, but can be driven by an expander or any other source. The auxiliary compressor 20 charges the storage 18 with compressed air during off-peak hours. An outlet 22 of the storage 18 is preferably connected with a heat exchanger 24. The heat exchanger 24 also receives exhaust air 25 from the main expansion turbine 14. Instead, or in addition to the exhaust air 25 from the main turbine 14, the heat exchanger 24 can receive any externally available source of heat.

An outlet 26 of the heat exchanger 24 is connected to a pressure reducing structure such as an expander 28 that is preferably connected to a generator 30 for generating electric power produced by the expander 28. The heat exchanger, heating the compressed air sent to the expander 28, is optional. Compressed air from the source of compressed air (e.g., storage 18) can be supplied directly to the expander 28. Since the expander 28 reduces the pressure of the compressed air, the temperature of the compressed air is reduced. Thus, cold (lower than ambient temperature) exhaust air of the expander 28 is connected via structure 32 with the ambient air at inlet 13 so that ambient inlet air and the colder the expander exhaust air are mixed, reducing the overall temperature of the inlet air prior to being received by the main compressor 12. In the embodiment, the structure 32 is piping connected between an exhaust of the pressure reducing structure 28 and the inlet 13 to the main compressor 12.

Thus, during peak hours, compressed air is withdrawn from the storage 18, preheated in the heat exchanger 24 and sent to the expander 28 that generates additional power. The expander exhaust air (lower than ambient temperature) is mixed with the combustion turbine assembly ambient inlet air reducing the inlet air temperature and increasing the combustion turbine assembly power.

FIG. 1 shows expander exhaust air, mixed with the ambient inlet air, at temperature of 10 C. The reduction of the inlet air temperature at the inlet of the main compressor 12 from the ambient temperature of 35 C to 10 C increases the GE 7241 combustion turbine assembly power by approximately 20 MW. In addition, the expander 28 with airflow similar to the combustion turbine assembly inlet flow being preheated in the heat exchanger 24 to 450-500 C, generates power that is approximately 250 MW. The compressor 21 consumes the off-peak power and the compressor flow, discharge pressure and power consumption depends on the characteristics of the compressed air storage 18 and other economic and operational parameters and could be approximately equal to the expander power. In the embodiment of FIG. 1, at 10 C, the estimated net power of the combustion turbine assembly is 173.0 MW and the net heat rate of the combustion turbine assembly is 10,000 kJ/kWh. The net heat rate of the expander 28 is zero. The total estimated power and heat rate of the overall combustion turbine system 10 with the power augmentation are 423 MW and 4080 kJ/KWh, respectfully.

The economics of the overall system 10 with the expander and the injection of the expander exhaust airflow into the main compressor inlet are driven by capital costs and the total incremental power sold at peaking power prices minus the compressor power purchased at off-peak power costs.

Figure 2:
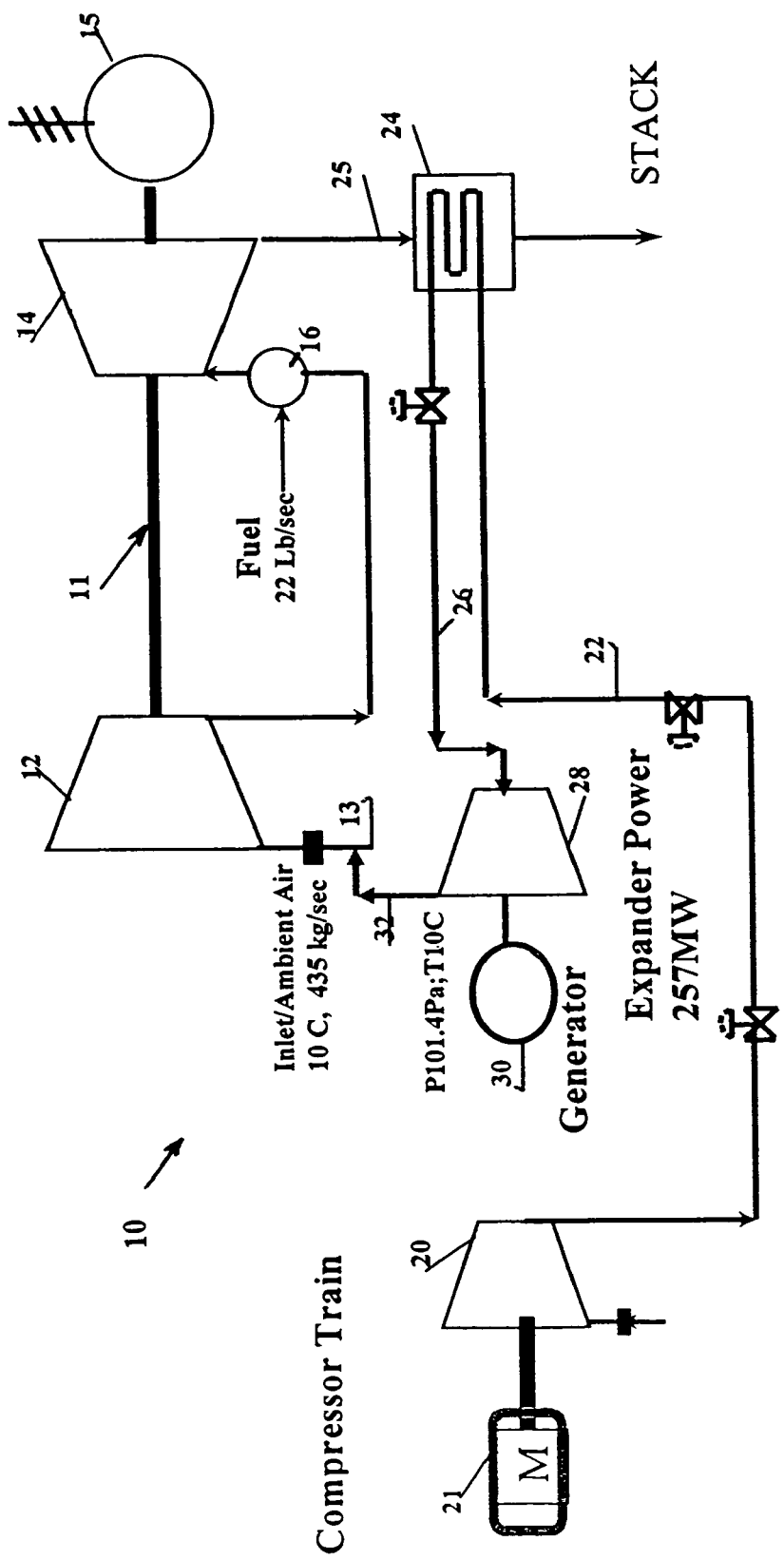
FIG. 2 is a schematic illustration of a combustion turbine power generation system with power augmentation using an auxiliary compressor supplying compressed air, preheated in a heat exchanger, to an expander, with the expander exhaust flow, having lower than ambient temperature, being mixed with the combustion turbine power generation system inlet flow provided in accordance with another embodiment of the present invention.

The overall parameters of the system 10 are optimized based on the overall plant economics including:
  Additional components capital and operational costs
  The combustion turbine power augmentations
  The expander 28 additional peaking power produced
  The auxiliary compressor 20 off-peak power consumption FIG. 2 shows another embodiment of the system 10' wherein the storage 18 is eliminated and at least one auxiliary compressor 20 delivers compressed air to the heat exchanger 24 via connection 22'. The power augmentation of the combustion turbine assembly 11 are approximately 20 MW and the same as shown in FIG. 1, when the inlet air to the compressor 12 is reduced to 10 C. The total power of the overall GE 7241 combustion turbine power generation system 10 with power augmentation is approximately 173 MW plus additional power of an expander 28 minus the auxiliary compressor power 20.

It is contemplated that source of compressed air sent to the heat exchanger 24 (or directly to the expander 28) can be from any suitable source, and the cold air mixed with the ambient inlet air and introduced to the inlet of the main compressor 12 can result from any type of expansion process, or can be any source of air that is cooler than the ambient air.

The use of the expander 28 to reduce the air inlet temperature to the compressor 12 can be employed in a Combustion Turbine/Combined Cycle Power Plant. This system preferably includes the following additional (to a combustion turbine assembly 11) components:
  The pressure reducing structure (e.g., air expander 28),
  Heat exchanger 24 recovering the combustion turbine 14 exhaust heat and feeding the expander 28,
  The auxiliary compressor 20 delivering the compressed air to the heat exchanger,
  BOP piping and specialties This system would operate as follows. The auxiliary compressor 20 delivers compressed air to the heat exchanger 24 where the air is preheated and sent to the expander 28 that generates additional power. The exhaust of the expander 28 (with a lower than ambient temperature) is mixed with the combustion turbine assembly 11 inlet air 13 reducing its temperature and increasing the combustion turbine assembly 11 power. As in the embodiment of FIG. 1, the heat exchanger 24 is optional.

The overall system parameters are optimized based on the overall plant economics including:
  Additional components capital and operational costs
  The combustion turbine power augmentation
  The additional peaking power produced by the expander minus the auxiliary compressor power consumption Although the pressure reducing structure has been shown to be an air expander 28, this structure can be an orifice or any other structure that reduces the pressure of compressed air to atmospheric pressure and thus reduces the temperature of the compressed air below the ambient temperature.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A combustion turbine power generation system comprising:
  a combustion turbine assembly including a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power,
  pressure reducing structure constructed and arranged to reduce pressure of compressed air, from a source of compressed air, to atmospheric pressure and thus to reduce a temperature of the compressed air, from the source of compressed air, to a temperature below ambient temperature when exhausted from the pressure reducing structure,
  structure associated with the pressure reducing structure constructed and arranged to permit mixing of the air exhausted from the pressure reducing structure and the ambient inlet air to reduce a temperature of inlet air to the main compressor, and an air storage defining the source of compressed air.

2. The system of claim 1, wherein the pressure reducing structure is an air expander.

3. The system of claim 2, further comprising a heat exchanger constructed and arranged to receive heat from a source of heat and to receive compressed air from the source of compressed air, the expander being constructed and arranged to receive compressed air heated by the heat exchanger.

4. The system of claim 3, wherein the heat exchanger receives exhaust from the main expansion turbine thereby defining the source of heat.

5. The system of claim 1, further comprising at least one auxiliary compressor for charging the air storage.

6. The system of claim 2, further including an electric generator associated with the expander for generating electric power.

7. The system of claim 1, wherein the structure to permit mixing is piping connected between an exhaust of the pressure reducing structure and an air inlet to the main compressor.

8. A combustion turbine power generation system comprising:

a combustion turbine assembly including a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power, means for heating compressed air, from a source of compressed air, means for reducing pressure of the heated compressed air to atmospheric pressure and thus for reducing a temperature of the compressed air, from the source of compressed air, to a temperature below ambient temperature when exhausted from the means for reducing pressure, and means, associated with the means for reducing pressure, for permitting mixing of the air exhausted from the pressure reducing structure and the ambient inlet air to reduce a temperature of inlet air to the main compressor.

9. The system of claim 8, wherein the means for reducing pressure structure is an air expander.

10. The system of claim 9, wherein the means for heating is a heat exchanger constructed and arranged to receive heat from a source of heat and to receive compressed air from the source of compressed air, the expander being constructed and arranged to receive compressed air heated by the heat exchanger.

11. The system of claim 10, wherein the heat exchanger receives exhaust from the main expansion turbine thereby defining the source of heat.

12. The system of claim 8, further comprising an air storage defining the source of compressed air.

13. The system of claim 8, further comprising at least one auxiliary compressor for charging the air storage.

14. The system of claim 8, further comprising at least one auxiliary compressor defining the source of compressed air.

15. The system of claim 9, further including an electric generator associated with the expander for generating electric power.

16. The system of claim 8, wherein the means for mixing is piping connected between an exhaust of the means for reducing pressure and an air inlet of the main compressor.

17. A method reducing a temperate of inlet air to a combustion turbine assembly, the combustion turbine assembly including a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power, the method including:

providing a source of compressed air, heating compressed air from the source of compressed air, reducing pressure of the heated compressed air from the source to atmospheric pressure and thus reducing a temperature of the heated compressed air from the source to a temperature below ambient temperature, and mixing the compressed air at a temperature below ambient temperature with the ambient inlet air to reduce a temperature of the inlet air to the main compressor.

18. The method of claim 17, wherein the step of heating the compressed air includes providing a heat exchanger receiving the compressed air from the source and receiving exhaust from the main expansion turbine.

19. The method of claim 17, wherein the step of heating a compressed air includes providing a heat exchanger receiving the compressed air from the source and receiving heat from a source of heat.

20. The method of claim 17, wherein the source of compressed air is an air storage.

21. The method of claim 17, wherein the source of compressed air is at least one auxiliary compressor.

22. The method of claim 17, wherein the step of reducing pressure includes expanding the compressed air from the source of compressed air.

23. The method of claim 22, wherein expanding the compressed air includes providing an expander and the method further includes providing an electric generator associated with the expander, the generator being constructed and arranged to generate electric power.

24. A combustion turbine power generation system comprising:

a combustion turbine assembly including a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power, an expander constructed and arranged to reduce pressure of compressed air, from a source of compressed air, to atmospheric pressure and thus to reduce a temperature of the compressed air, from the source of compressed air, to a temperature below ambient temperature when exhausted from the expander, structure associated with the expander constructed and arranged to permit mixing of the air exhausted from the expander and the ambient inlet air to reduce a temperature of inlet air to the main compressor, and a heat exchanger constructed and arranged to receive heat from a source of heat and to receive compressed air from the source of compressed air, the expander being constructed and arranged to receive compressed air heated by the heat exchanger.

25. The system of claim 24, wherein the heat exchanger receives exhaust from the main expansion turbine thereby defining the source of heat.

26. The system of claim 24, further comprising at least one auxiliary compressor defining the source of compressed air.

27. A method reducing a temperate of inlet air to a combustion turbine assembly, the combustion turbine assembly including a main compressor constructed and arranged to receive ambient inlet air, a main expansion turbine operatively associated with the main compressor, a combustor constructed and arranged to receive compressed air from the main compressor and to feed the main expansion turbine, and an electric generator associated with the main expansion turbine for generating electric power, the method including:
   providing a source of compressed air,
   reducing pressure of the compressed air from the source to atmospheric pressure and thus reducing a temperature of the compressed air from the source to a temperature below ambient temperature, and
   mixing the compressed air at a temperature below ambient temperature with the ambient inlet air to reduce a temperature of the inlet air to the main compressor,
   wherein the source of compressed air is an air storage.

* * * * *